Figure 1:
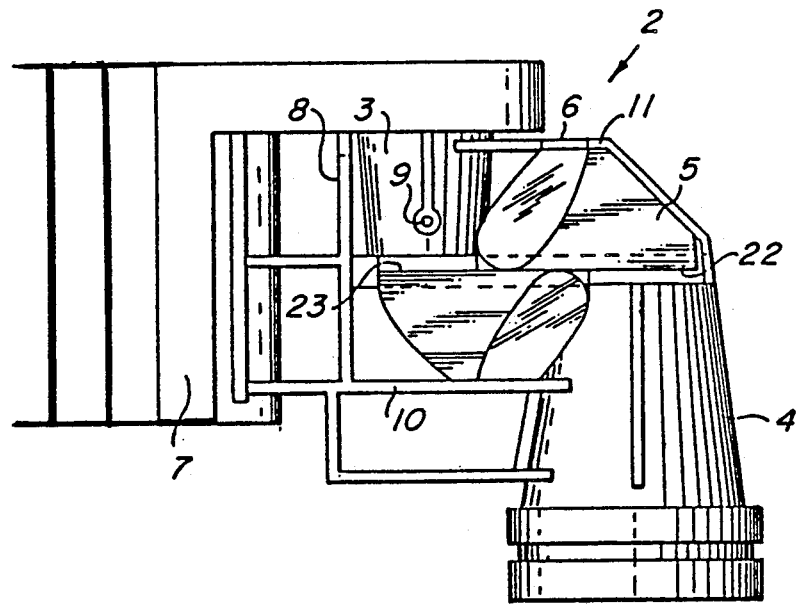

United States Patent [19]

Swarovski et al.

[11] Patent Number: 4,993,820
[45] Date of Patent: Feb. 19, 1991

[54] OPTICAL INSTRUMENT, IN PARTICULAR BINOCULARS

[75] Inventors: Daniel Swarovski, Wattens; Kurt Schwab, Mils, both of Austria

[73] Assignee: D. Swarovski and Company, Austria

[21] Appl. No.: 218,098

[22] Filed: Jul. 12, 1988

Related U.S. Application Data

[63] Continuation of Ser. No. 893,158, Aug. 5, 1986, which is a continuation of Ser. No. 467,340, Feb. 17, 1983, Pat. No. 4,626,080.

[30] Foreign Application Priority Data

Feb. 17, 1982 [DE] Fed. Rep. of Germany ....... 3205583

[51] Int. Cl.$^5$ ................ G02B 23/02; G02B 7/18; G02B 23/18
[52] U.S. Cl. ................ 350/569; 350/287; 350/589
[58] Field of Search ........... 350/545, 318, 287, 242, 350/252, 569, 551, 320, 417, 589, 590

[56] References Cited

U.S. PATENT DOCUMENTS

| | | | |
|---|---|---|---|
| 869,769 | 10/1907 | Bell | 350/545 |
| 1,533,248 | 4/1925 | Harwix | 350/287 |
| 2,364,811 | 12/1944 | Perkins | 350/589 |
| 2,463,959 | 3/1949 | Flint | 350/569 |
| 3,749,479 | 7/1973 | Kempf | 350/417 |
| 4,056,303 | 11/1977 | Swarovski et al. | 350/551 |
| 4,460,424 | 7/1984 | Buser et al. | 350/417 |
| 4,626,080 | 12/1986 | Swarovski et al. | 350/569 |

FOREIGN PATENT DOCUMENTS

| | | | |
|---|---|---|---|
| 992989 | 10/1951 | France | 350/287 |
| 541749 | 11/1941 | United Kingdom | 350/321 |
| 850250 | 10/1960 | United Kingdom | 350/587 |

OTHER PUBLICATIONS

Harrison, R. W., "Mounting for Corner Cube Prisms", IBM Tech. Disc. Bull. 12-1973, pp. 2370.

Primary Examiner—Bruce Y. Arnold
Assistant Examiner—Ronald M. Kachmarik
Attorney, Agent, or Firm—Fulbright & Jaworski

[57] ABSTRACT

The optical instrument, in particular binoculars, is characterized by exhibiting an integral stable inner housing including the eyepiece tube, the objective tube, the prism seat and possibly the hinge mechanism. The inner housing is encased in plastic foam which determines the outer contour of the instrument.

15 Claims, 2 Drawing Sheets

FIG. 3
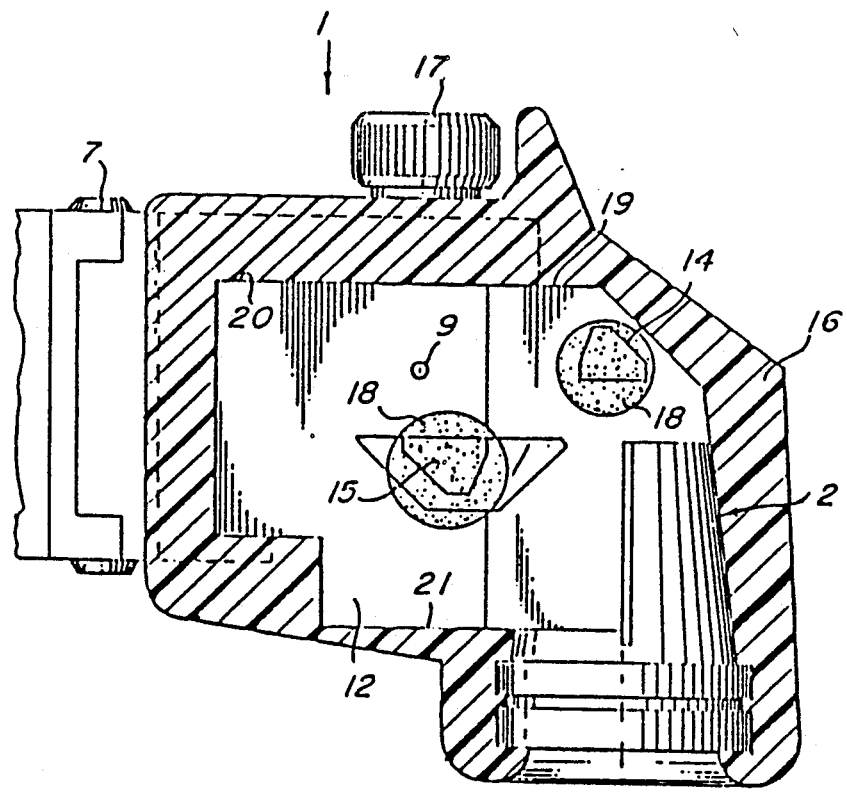
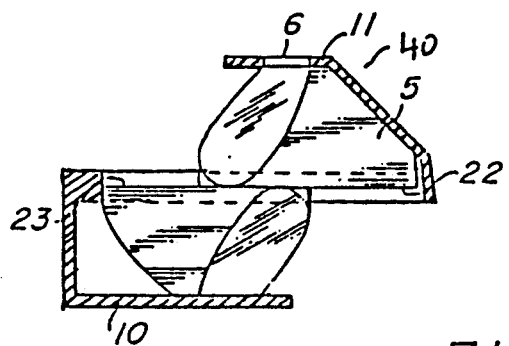
FIG. 4

OPTICAL INSTRUMENT, IN PARTICULAR BINOCULARS

This application is a continuation of application Ser. No. 893,158 filed Aug. 5, 1986, now abandoned, which in turn was a continuation of U.S. Ser. No. 467,340, filed Feb. 17, 1983, now U.S. Pat. No. 4,626,080.

The invention relates to an optical instrument, in particular binoculars.

Classical binoculars comprise a housing in which the optical elements, i.e. the prisms and lenses, are inserted. The housing also defines the outer contour of the binoculars. The binoculars are usually further encased by a synthetic or rubber film.

German Auslegeschrift No. 1 241 144 discloses the use of a cork coating in order to enable the binoculars to float.

The disadvantages of classical binoculars must be seen in particular in the fact that it is difficult to vary their outer shape since this requires a fundamental change in the housing, and they are not satisfactory with respect to shock-resistance, floatablility and waterproofness.

German Patent No. 25 22 738 and German Patent No. 26 18 497 describe binoculars having a fundamentally different construction. In this system, the image erecting system is combined with an eyepiece tube and a lens barrel by means of casting resin to form a stabilized core which is then encased in plastic foam.

The binoculars are thus constructed of piece parts which are firmly connected with each other. The outer shape is determined by the plastic foaming.

These foamed binoculars are characterized by the fact that their outer shape can easily be modified, since this merely requires modification of the foaming mold while the inner portion may remain unchanged. There is much more freedom in designing the outer shape than in the case of classical binoculars, since the shape is not determined by a housing. Furthermore, foamed binoculars are characterized by a high degree of shock-resistance, are insensitive to fluctuations in temperature, and may be designed so as to float and be waterproof.

On the other hand, the disadvantage is that the construction of the core of the binoculars out of piece parts is expensive, and the rigid connection between the image erecting system and the tubes may lead under certain circumstances to the former being damaged.

The invention is based on the problem of providing an optical instrument, in particular binoculars, having the advantages of foamed binoculars and also involving simple production.

The invention is based on the finding that this problem can be solved by providing an inner housing which does not determine the outer shape, but rather is covered in plastic foam.

The subject-matter of the invention is an optical instrument, in particular binoculars, in which a stabilized core is entirely or partially encased in plastic foam, at the same time forming the housing of the instrument, characterized in that it exhibits a stable inner housing including the eyepiece tube, the objective tube, the prism seat and possibly the hinge mechanism.

The inventive binoculars are characterized by the fact that they can be constructed with little trouble. The inner housing is usually a two-part injection molded part into which only the prisms must be inserted, so that foaming can be carried out after the two parts have been joined together.

It is greatly advantageous that, when Porro prisms are used, they can be stuck or cemented together before being inserted, since the accuracy of their position relative to each other is of crucial importance for optical quality. On the other hand, the accuracy of the position of double prisms within the inner housing is less crucial. Without diminishing the quality, the prisms may be axially displaced somewhat or also tilted.

In the inventive binoculars, the tubes no longer need to be stuck to the prisms. This allows for the elimination of a time-consuming working operation. This further avoids the danger of the prisms being damaged due to the varying expansion of the materials when subjected to extreme temperature changes.

Finally, the prisms can be mounted by means of very small abutment means (in particular holding edges) whose contact surfaces on the prisms are smaller than those necessary for adhesion, which means that prisms of smaller extension may be used, thus saving weight and costs.

The outer shape of the optical instruments can be easily varied because it is not determined by the inner housing but rather by the plastic foaming, which allows the designer great freedom in shaping. The possible use of soft, highly elastic plastic even makes it possible to select shapes in which there are re-entrant portions. This is significant, for example, for certain surface textures such as an orange peel structure.

Any desired change of shape can be put into practice easily, as one can select from a wide range of possible variations of shape simply by changing the foaming mold while maintaining the inner housing. In this way various easily handled and aesthetically satisfying shapes can be produced.

The prism seat is adapted to the prisms. Thus the inner housing is preferably also adapted to the shape of the optical instrument. It therefore differs fundamentally from known housings which are adapted to the outer shape of the optical instrument and exhibit appropriate mounting means for the prisms.

The inner housing preferably exhibits a minimal form and size in accordance with the technical requirements. Essentially, only the paths of light are kept free and the prisms encased. The shape of the known housings, on the other hand, is determined by their usability.

The inner housing may be enlarged beyond its minimal form, for example, in the direction of the hinge mechanism, and may exhibit air chambers, for example. This allows for a further reduction in the weight of the binoculars.

The inner housing is preferably an integral, stable unit consisting preferably of two parts.

The inner housing generally has essentially uniform wall thickness in all areas, as is essential to injection molded parts. It is only possible to combine the adaptation of the shape of the inner housing to the prisms, i.e. its formation as a prism seat, with the requirement of uniform wall thickness when the housing can be designed independently of the outer shape of the instrument.

The prisms are fixed by simply being inserted into the inner housing in their correct position. It is not necessary to adjust the prisms. The device is adjusted at the objective.

Porro prisms or ridge prisms may be used. Ridge prisms are preferably inserted into a positioning means such as a prism seat having corresponding edges and consisting of one piece, or preferably two pieces. The prisms seat may form an independent or part non-intregal part 40 (FIG. 4) of the inner housing and be inserted into the latter preferably from the side. The prism seat preferably exhibits openings which allow for the prisms to be bound elastically to the prism seat, for example by means of silicon rubber.

The inner housing is encased in plastic foam which defines the outer shape. The thickness in plastic casing varies locally, whereas in known optical instruments a coating of plastic or rubber is used of uniform thickness.

A further advantage of the optical instruments according to the invention is that they may be designed so as to be waterproof. The fact that the core is encased in plastic prevents water vapor from penetrating inside. A completely gasproof construction is achieved by casting around the aligned objective lenses and using gasproof eyepieces.

The inventive binoculars are characterized by high torsional stiffness and impact resistance. The stable inner housing is encased in soft plastic. The soft plastic is able to absorb large impact energies and thus protect the optical elements from being damaged.

The optical instruments are further characterized by extremely high resistence to temperature changes. They can withstand fluctuations in temperature ranging from −60 to +80° C.

By using a plastic foam with a specific weight less than that of water, binoculars can be produced which float.

Figure 2:
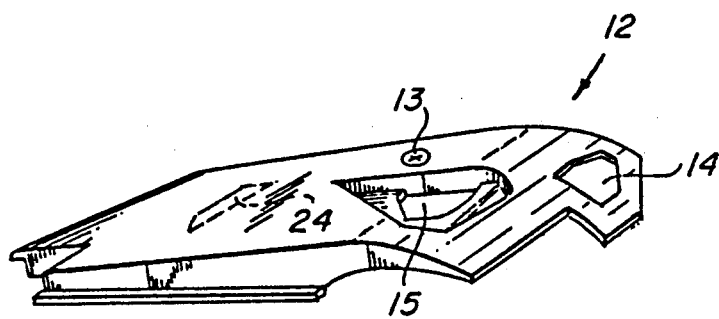

An example of binoculars according to the invention is shown in the drawings, in which FIG. 1 shows an inner housing with inserted prisms, from the top, FIG. 2 shows the lid portion of the inner housing, from the top, and FIG. 3 shows binoculars according to the invention, partly from the top and partly in cross-section.

FIG. 4 shows a sectional non-integral prism seat holding prisms.

The stable inner housing 2 shown in FIG. 1 includes as its essential elements eyepiece tube 3, objective tube 4 and prism seat 6.

Prism seat 6 is formed by various contact surfaces or holding edges such as holding edges 10 and 11 shown.

The inner housing shown also includes hinge mechanism 7. Rigid areas 8 give the housing the necessary torsional stiffness.

Porro prisms 5 are preferably stuck to each other before insertion thus forming a preformed prismatic image erecting system. They are held in position by the preformed prism seat. Screwhole 9 serves the purpose of fixing on lid 12.

Inner housing 2 preferably has a two-part construction, but may also be constructed of several parts. It is preferred to provide a housing portion 20 including the tubes, the prism seat and possibly the hinge mechanism, and a lid 12 or appropriate means for lidding which is firmly connected with housing portion 20.

FIG. 2 shows lid 12. It preferably has recesses 14, 15. The recesses serve the purpose of allowing for the prisms to be elastically bound to the inner housing by the use of an elastic adhesive such as silicon rubber. Such recesses may also be provided in housing portion 20.

A screwhole 13 may be provided on housing portion 20 to fix on lid 12. Lid 12 may also exhibit one or more suitable holding edges 24 for the prisms.

FIG. 3 shows binoculars, partly in cross-section, in which the inner housing 2 including housing portion 20 and lid 12 is enclosed in plastic foam 16. Binoculars 1 have a hinge mechanism 7. Eyepiece 17 is also shown.

The crack 21 between housing portion 20 and lid 12 is preferably sealed, which may be accomplished with sealing means 19, for example silicon a rubber caoutchouc sealing mass. Recesses 14, 15 are also preferably closed off by cover 18, which in turn may consist of an elastic silicon rubber sealing mass.

In this way a completely sealed inner housing 2 is obtained which assures that the instrument is waterproof.

As can be seen in FIG. 1, the prisms are not in direct contact with the tubes. This avoids possible damage to the prisms, and also involves the advantage that the procedural step of pasting the prisms to the tubes may be omitted.

The holding edges for prisms 5 in the area of the light admission surface 22 and light exit surface 23 are kept very narrow so that optimal light passage is obtained with a minimal constructional size of the prisms.

Covering caps as provided in the binoculars described in German Patent No. 25 22 738 are not necessary.

Inner housing 20 preferably is made of rigid plastic and is injected as an injection molded part, the openings of the tubes being kept free by means of extractable male molds.

The shape of inner housing 2 is determined solely by the optical requirements. Essentially, the outer shape of the instrument is completely independent of the design of the inner housing. The inner housing may be designed in the constructionally most advantageous manner without any aesthetic considerations being necessary.

Finally, inner housing 2 is encased in plastic foam 16. This plastic foam simultaneously forms the mount or housing for the optical instrument, leaving out the hinge portion of the hinge mechanism.

Examples for soft, flexible plastic foam are latex foam, polymerisate foam, polycondensate foam, e.g. urea formaldehyde resin, phenol resin, silicon foam, epoxy resin foam and polyurethane foam. Flexible polyurethane foam is particularly preferred. Such flexible polyurethane foam is obtained from linear and weakly branched polyhydroxy compounds with a high molecular weight. The inner housing is foamed, leaving out the hinge portion of the hinge mechanism, in a suitable mold. The design of the mold depends on the particular optical instrument and its desired outer shape. The flexible, elastic plastic is intended to embed the inner housing. The thickness of the foamed layer is selected so as to assure that the inner housing is protectively embedded and is shock-resistant. No great demands are made upon the accuracy of the mold used for foam filling. The inner housing guarantees that there is no disadjustment during foam filling.

The foamable plastic, preferably foamable polyurethane, is introduced into the closed foam filling mold through suitable gates and foamed in place. An integral foam with a compacted outer skin is preferably formed to embed the inner housing.

Various colorants and pigments, stabilizers, catalysts and so on may be added to the plastic.

The objective and the eyepiece may also be foamed. However, it is preferred to insert the eyepiece and objective lenses after foaming.

Conventional objective and eyepiece systems of various designs and optical qualities may be used. Preferably eyepiece systems are used that are waterproof and gasproof and are of adjustable focus. The gasproof eyepiece is connected to the eyepiece tube in a suitable gasproof manner. The inserted objective lenses are aligned and then sealed off from the housing in a waterproof and gasproof manner, for example by being cast with plastic or silicon rubber. The eyepiece and objective systems are preferably inserted in such a way that they may be easily dismantled, for example when repair is necessary.

The inventive concept allows for the production of optical devices on a so-called "modular" basis. For a given shape, optical elements of various qualities and designs may be inserted. Equally, the outer shape of the optical device may be easily varied by replacing the mold used for foaming.

The invention has been described above primarily with reference to binoculars. However, it will readily be apparent to the expert that the invention is applicable to a large number of optical instruments such as telescopes, microscopes and so on.

We claim:

1. An optical instrument comprising:
   a plastic foam outer shaped member;
   an objective tube within said outer shaped member, an eyepiece tube within said outer shaped member, and a prism system within said outer shaped member providing an optical path through said optical instrument; and
   positioning means for said prism system arranged between said prism system and said outer shaped member, said positioning means exhibits a minimal form and;
   is adapted to receive a preformed nonintegral prism seat;
   said nonintegral prism seat is arranged in said positioning means and independent from said outer shaped member said objective tube and said eyepiece tube;
   wherein said positioning means and said prism seat are nonintegrally formed.

2. An optical instrument as in claim 1, wherein said positioning means further comprise a two-part construction.

3. An optical instrument as in claim 2, wherein said two-part construction comprises a housing portion and means for lidding said housing portion.

4. An optical instrument as in claim 2, further comprising a sealing mass, wherein the two-part construction defines a crack and wherein said crack is sealed with said sealing mass.

5. An optical instrument as in claim 3, wherein said positioning means exhibits recesses for allowing said prism system to be elastically bound.

6. An optical instrument as in claim 5 wherein said recesses are sealed off by an elastic sealing mass.

7. An optical instrument as in claim 1 wherein said preformed prism seat comprises holding edges for positioning the prism system.

8. An optical instrument as in claim 1 wherein the positioning means is made of rigid plastic.

9. An optical instrument as in claim 1 wherein said prism system further comprises a plurality of prisms which are cemented to each other.

10. A method of making an optical instrument comprising:
    forming a positioning means for an image reversing system;
    fixing two prisms relative to each other and inserting said fixed prisms into a nonintegral prism seat;
    inserting said nonintegral prism seat into said positioning means; and
    molding an outer protective housing around said positioning means.

11. A method as in claim 10, wherein said positioning means comprises a housing and a means for lidding said housing and further comprises the step of sealing a crack between said housing means and said means for lidding with a sealing mass.

12. A method as in claim 10 further comprising the steps of:
    elastically binding said prisms within said positioning means following the step of inserting.

13. An optical instrument comprising:
    a core housing;
    a preformed prismatic image erecting system within said core housing, between an objective tube and an eyepiece tube;
    an outer plastic foam member at least partially encasing said core housing thereby defining an outer contour of said optical instrument;
    said core housing exhibiting and adapted to receive a nonintegral preformed prism seat for positioning said prismatic image erecting system, and is arranged to isolate said prismatic image erecting system from said eyepiece tube, said objective tube and said plastic foam member, wherein said nonintegral prism seat and said core housing are nonintegrally formed; and means for elastically binding said prismatic image erecting system to said core housing.

14. An optical instrument according to claim 13, wherein said core housing exhibits a minimal form.

15. An optical instrument according to claim 13 wherein means for elastically binding comprises an elastic sealing mass arranged in recesses in said core housing.